(12) United States Patent
Konicek et al.

(10) Patent No.: US 8,442,562 B2
(45) Date of Patent: May 14, 2013

(54) END TO END ACKNOWLEDGMENT OF SMS MESSAGES

(76) Inventors: Jeffrey C. Konicek, Tolono, IL (US); Jon E. Kappes, Phoenix, AZ (US)

(*) Notice: Subject to any disclaimer, the term of this patent is extended or adjusted under 35 U.S.C. 154(b) by 702 days.

(21) Appl. No.: 12/504,903

(22) Filed: Jul. 17, 2009

(65) Prior Publication Data

US 2010/0016002 A1    Jan. 21, 2010

Related U.S. Application Data

(60) Provisional application No. 61/082,178, filed on Jul. 18, 2008.

(51) Int. Cl.
*H04W 4/00* (2009.01)

(52) U.S. Cl.
USPC ........... 455/466; 455/415; 455/416; 455/567; 379/418; 370/260; 370/261

(58) Field of Classification Search ................. 455/466, 455/415, 432.1, 567; 370/260, 261, 28, 349, 370/496, 522
See application file for complete search history.

(56) References Cited

U.S. PATENT DOCUMENTS

| | | | |
|---|---|---|---|
| 5,349,678 A | 9/1994 | Morris et al. | |
| 5,487,100 A | 1/1996 | Kane | |
| 5,845,202 A | 12/1998 | Davis | |
| 5,878,351 A | 3/1999 | Alanara et al. | |
| 6,201,974 B1 | 3/2001 | Lietsalmi et al. | |
| 6,333,973 B1 | 12/2001 | Smith et al. | |
| 2003/0143997 A1* | 7/2003 | Sawada et al. | 455/432 |
| 2003/0231753 A1* | 12/2003 | Casaccia | 379/207.02 |
| 2004/0203940 A1* | 10/2004 | Urs | 455/466 |

OTHER PUBLICATIONS

Kylanpaa, et al., Nomadic access to information services by a GSM phone, Computer & Graphics, 1996.
Anonymous, ETSI GSM 3.40, "Digital Cellular Telecommunications System (Phase 2+) Technical Realization of the Short Message Service Point/to/Point," v6.0.0, (1998).
Anonymous, "Technical Information Bulletin 03-02, SMS over SS7, National Communication System," Office of the Manager, National Communications System (NCS TIB 03-02), (Dec. 2003).

* cited by examiner

*Primary Examiner* — Anthony Addy
*Assistant Examiner* — Quan M Hua
(74) *Attorney, Agent, or Firm* — Law Offices of Steven G. Lisa, Ltd.; Justin Lesko, Esq.; James D. Busch, Esq.

(57) ABSTRACT

End to end acknowledgment of SMS messages based on sending an acknowledgement back to the sender of the SMS that the message was received after successful delivery.

15 Claims, 9 Drawing Sheets

OVERVIEW

NORMAL MSG FLOW

INTERRUPTED MSG FLOW

ROUTING ACK THROUGH ALTERNATE SYSTEM

ACKNOWLEDGMENTS STORED ON NET

FIG. 7

EXEMPLARY TEXT MESSAGE HEADER FIELDS AND PROPERTIES
(Note: not all required in all embodiments)

```
ACK CODE
ACK PRIORITY
ACK
DESTINATION
DELIVERY
ATTEMPT#
TO ADDRESS
FROM ADDRESS
TIME STAMP
```

```
MESSAGE BODY
```

EXEMPLARY USER INTERFACE QUERY TO ACKNOWLEDGE MESSAGE RECEIPT

EXEMPLARY USER INTERFACE REPORTING THAT THE MESSAGE WAS DELIVERED

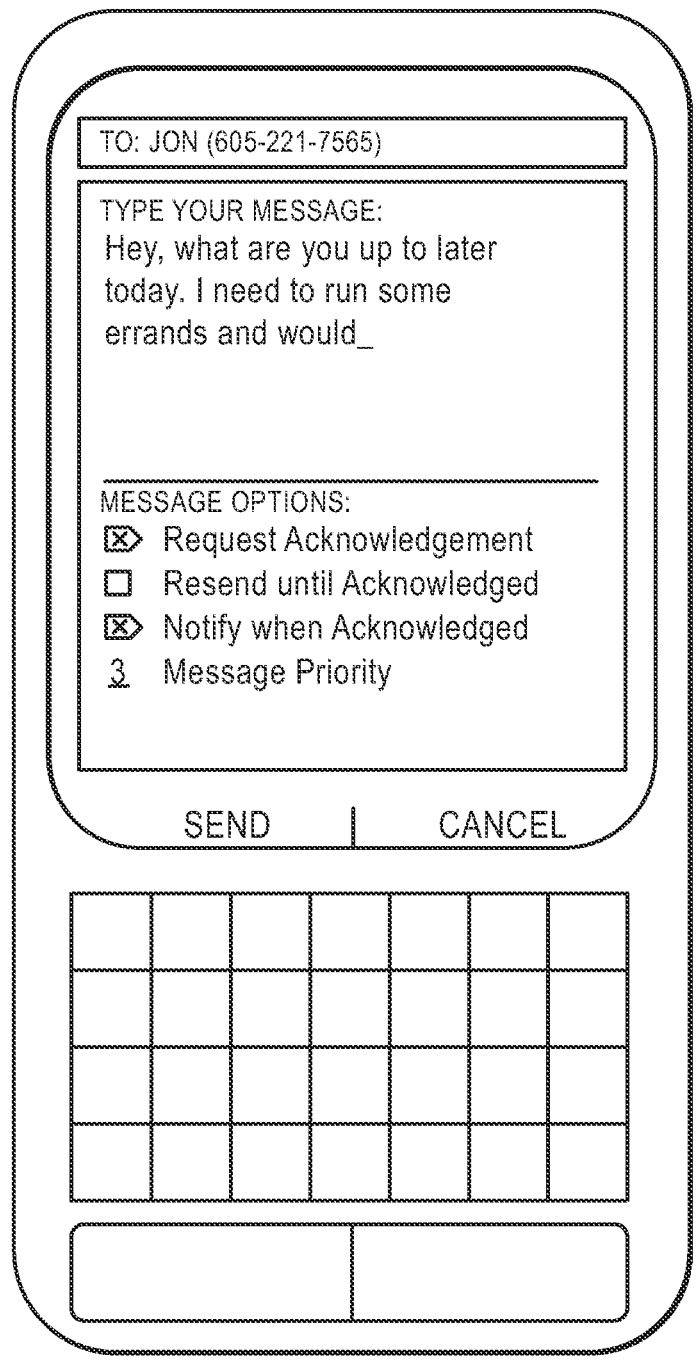

END TO END ACKNOWLEDGMENT OF SMS MESSAGES

CROSS REFERENCE TO RELATED APPLICATION

This application claims the benefit of Provisional Patent Application No. 61/082,178 filed Jul. 18, 2008, herein incorporated in its entirety by reference.

BACKGROUND OF THE INVENTION

1. Field of the Invention

The invention relates to, among other things, the field of wireless text messaging, commonly referred to SMS or short message service messaging, as well as devices, systems, software and firmware therefore.

2. Description of Related Art

Text messaging, or SMS, relates to sending short (160 characters (US) or fewer, including spaces) alphanumeric messages (and in some implementations can include any 8-bit binary represented characters.) It is available on most mobile phones, some personal digital assistants and computers (typically via internet sites providing SMS services). The most common application of SMS is person-to-person messaging, but text messages can also be used to interact with automated systems, such as ordering products and services for mobile phones, participating in contests, receiving news alerts, receiving calendar alerts, voting in popular TV shows, receiving weather or coastal warning alerts or other warnings of impending disaster, alerting students on college campuses to conditions of which they should be made aware, etc. There are also some services available on the Internet that allow users to send text messages free of direct charge to the sender and also provide a place to receive replies to such messages or for the user to receiving initial SMS messages sent to him. Such services are also available on the internet for fee per use or subscription.

One drawback of the SMS system is a lack of delivery guarantee. The SMS system basically forwards the message to the recipient without regard to whether he actually receives it. MMS provides a delivery guarantee as part of its protocol, but MMS messages are significantly more expensive and complex to send and receive and may not be available yet on older or cheap handsets or on as many internet portals. In this invention, the sender device and the receiving device, with appropriate software as described herein, work in concert to assure SMS delivery.

So as to reduce the complexity and length of the Detailed Specification, and to fully establish the state of the art in certain areas of technology, Applicant(s) herein expressly incorporate(s) by reference all of the following materials identified in each numbered paragraph below.

1) U.S. Pat. No. 7,389,116 System, method, and computer program product for short message service (SMS) rating;

2) U.S. Pat. No. 7,386,009 Method and apparatus for transmission of internet control message protocol messages as short message service (SMS) messages in a communications network comprised of mobile stations;

3) U.S. Pat. No. 7,373,384 Short message (SMS) storage system;

4) U.S. Pat. No. 7,369,865 System and method for sending SMS and text messages;

5) U.S. Pat. No. 7,369,528 Method and system to send SMS messages in a hybrid network;

6) U.S. Pat. No. 7,318,098 Method and system for short message service (SMS) transactions for wireless devices;

7) U.S. Pat. No. 7,296,156 System and method for SMS authentication;

8) U.S. Pat. No. 7,139,259 Method and apparatus for conveying reports for SMS messages in wireless communication systems;

9) U.S. Pat. No. 7,113,783 System for transmitting and receiving short message service (SMS) messages 10) U.S. Pat. No. 6,959,194 SMS-messaging;

11) U.S. Pat. No. 6,505,052 System for transmitting and receiving short message service (SMS) messages;

12) U.S. Pat. No. 6,223,045 Satellite delivery of short message service (SMS) messages;

13) U.S. Pat. No. 5,915,222 Transporting short message service (SMS) messages within a telecommunications network;

14) "SMS and MMS Interworking in Mobile Networks" by Arnaud Henry-Labordere and Vincent Jonack (Artech House Publishers, 2004);

15) "Mobile Application Development with SMS and the SIM Toolkit" by Scott Guthery and Mary Cronin (McGraw-Hill Professional, 2001);

16) "Mobile Messaging Technologies and Services: SMS, EMS and MMS" by Gwenaël Le Bodic (John Wiley & Songs, 2003); and 17) "Wireless Messaging Demystified: SMS, EMS, MMS, IM, and others" by Donald J. Longueuil (McGraw-Hill Professional, 2002).

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

BRIEF SUMMARY OF THE INVENTION

The present invention provides among other things a system where the SMS sender device and the receiving device work in concert to assure SMS delivery with appropriate software as described herein.

It is an object of the invention to send an acknowledgement back to the sender of the SMS that the message was received after successful delivery.

It is another object of the invention to have the sending device retransmit the SMS to the receiving device if no acknowledgement is received.

It is another object of the invention that the sender have control over which messages require an acknowledgement to be received.

It is another object of the invention that the sender have control over which messages request an acknowledgement to be sent back to the sending device.

It is another object of the invention that the receiver has control over which messages may generate an acknowledgement back to the sender.

It is another object of the invention that the existing SMS system be used.

It is another object of the invention that a secondary SMS-like system be used to transport acknowledgements. The invention has various additional objectives, which are not restated here for the sake of brevity.

The above and other objects may be achieved using devices and methods that acknowledge received SMS and other messages by sending a response SMS message as an acknowledgment of receiving the SMS message; by devices and methods that transmit SMS and other messages and receive response SMS message as an acknowledgement that the SMS message was received; and by computer readable media having program code thereon operable to send an SMS acknowledgment message upon receiving an SMS message.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. § 112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . "or "step for performing the function of . . . ," if the claims also recite any structure, material or acts in support of that means or step, or that perform the recited function, then it is the clear intention of the inventors not to invoke the provisions of 35 U.S.C. § 112, ¶ 6. Moreover, even if the provisions of 35 U.S.C. §112, ¶ 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 7 depicts examples of message headers relating to acknowledgements.

FIG. 10 depicts an example cellular phone with a message editor interface.

Figure 1:
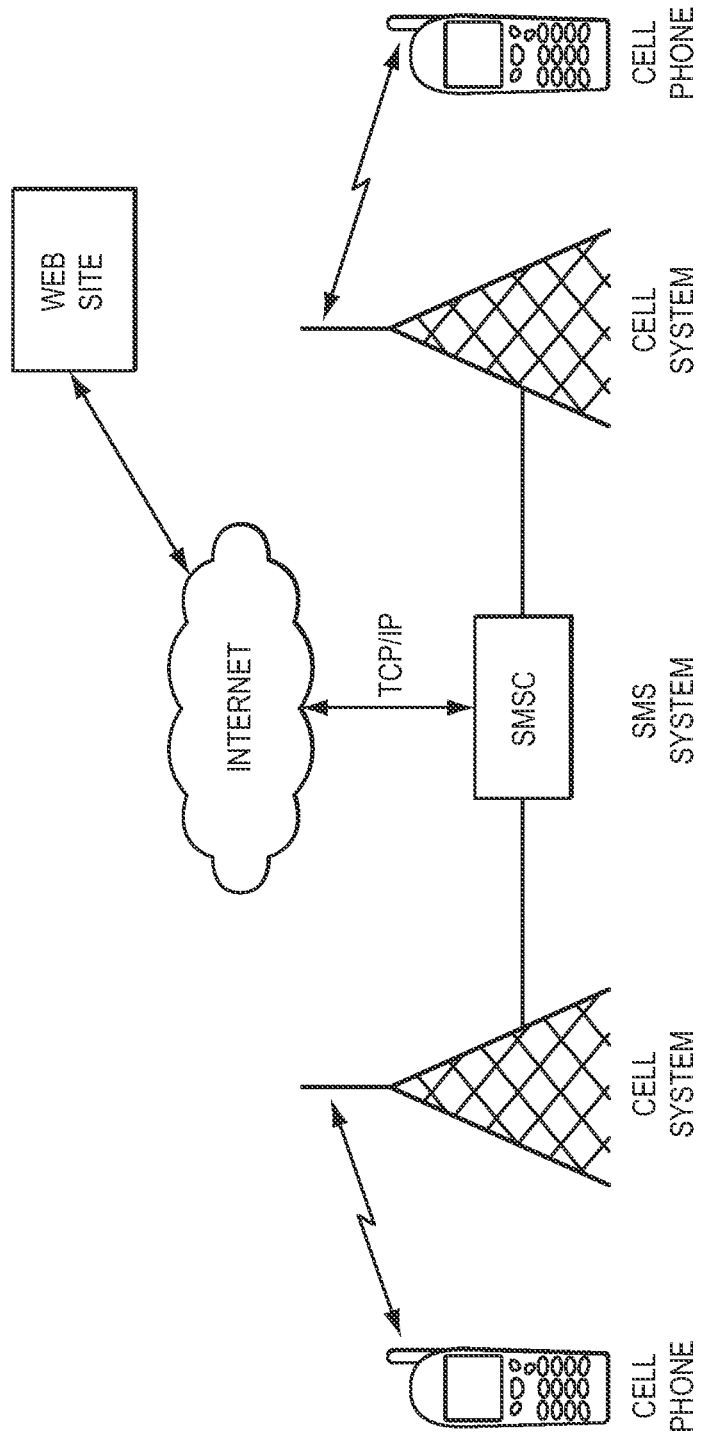
FIG. 1 depicts an example network schematic structure.
Figure 2:
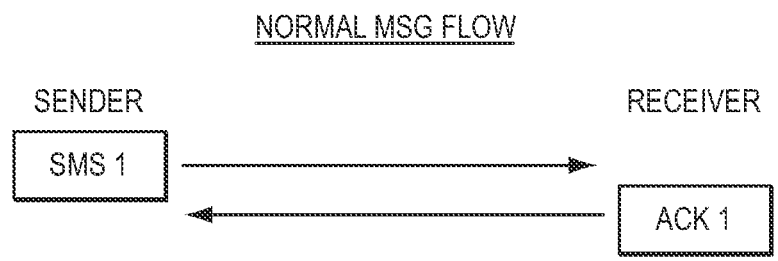
FIG. 2 depicts an example of a normal message and acknowledgement flow.
Figure 3:
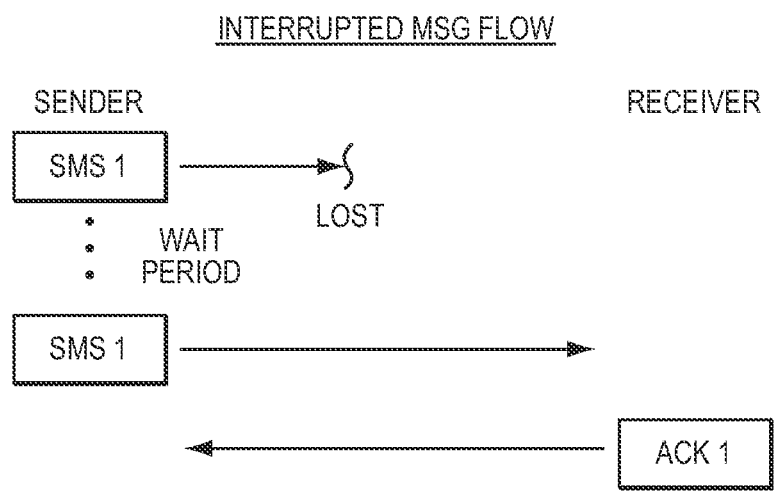
FIG. 3 depicts an example of an interrupted message and acknowledgment flow.
Figure 4:
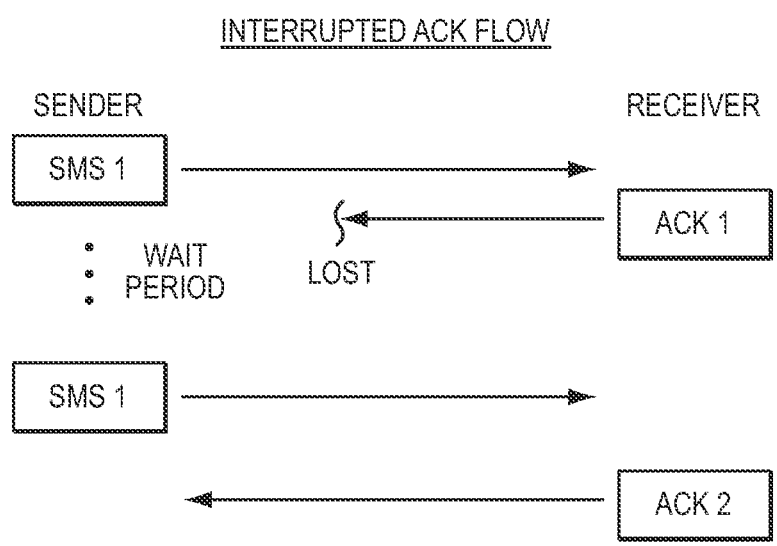
FIG. 4 depicts an example of an interrupted acknowledgement flow.
Figure 5:
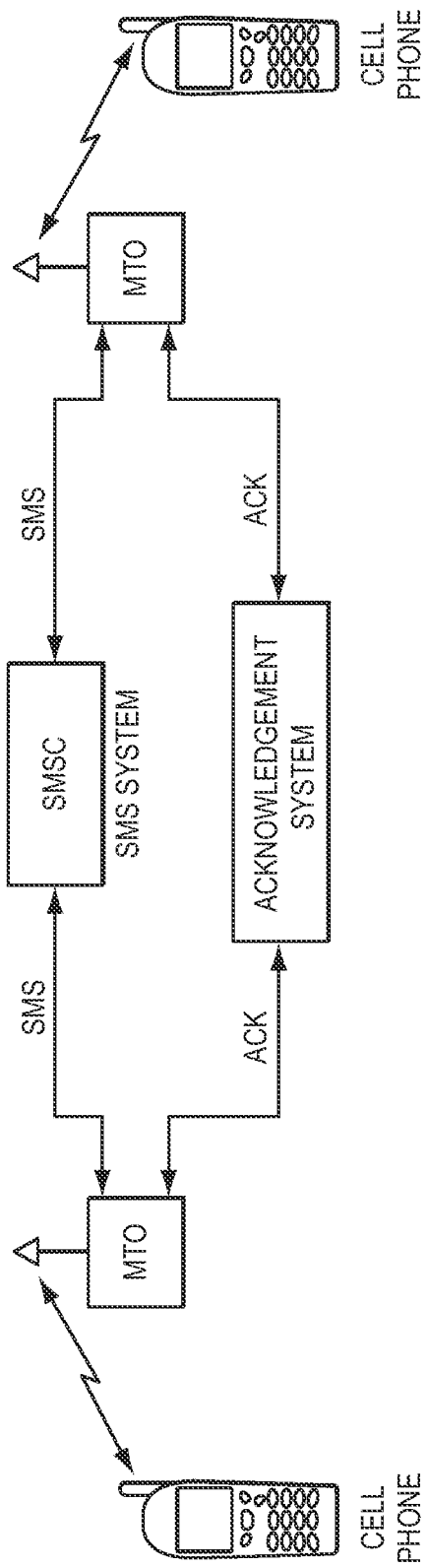
FIG. 5 depicts an example of an acknowledgement sent to a third party.
Figure 6:
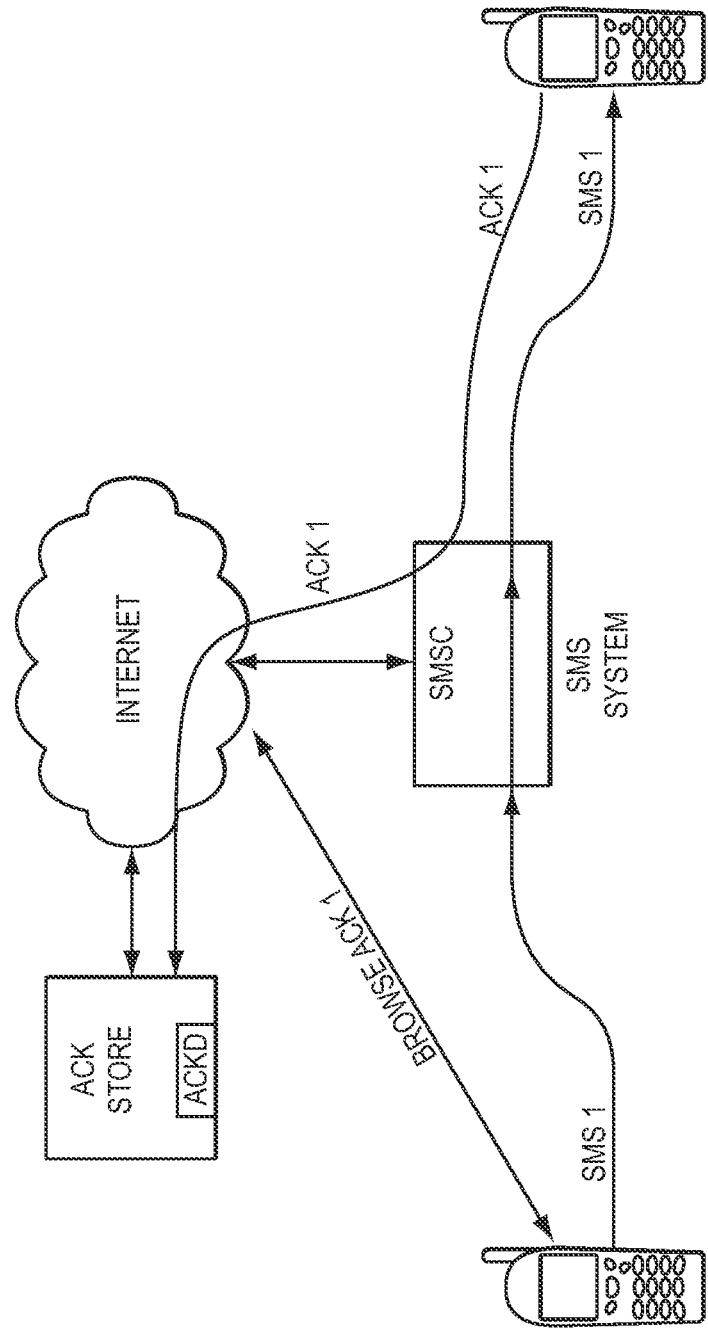
FIG. 6 depicts an example of an acknowledgement stored on a network.
Figure 8:
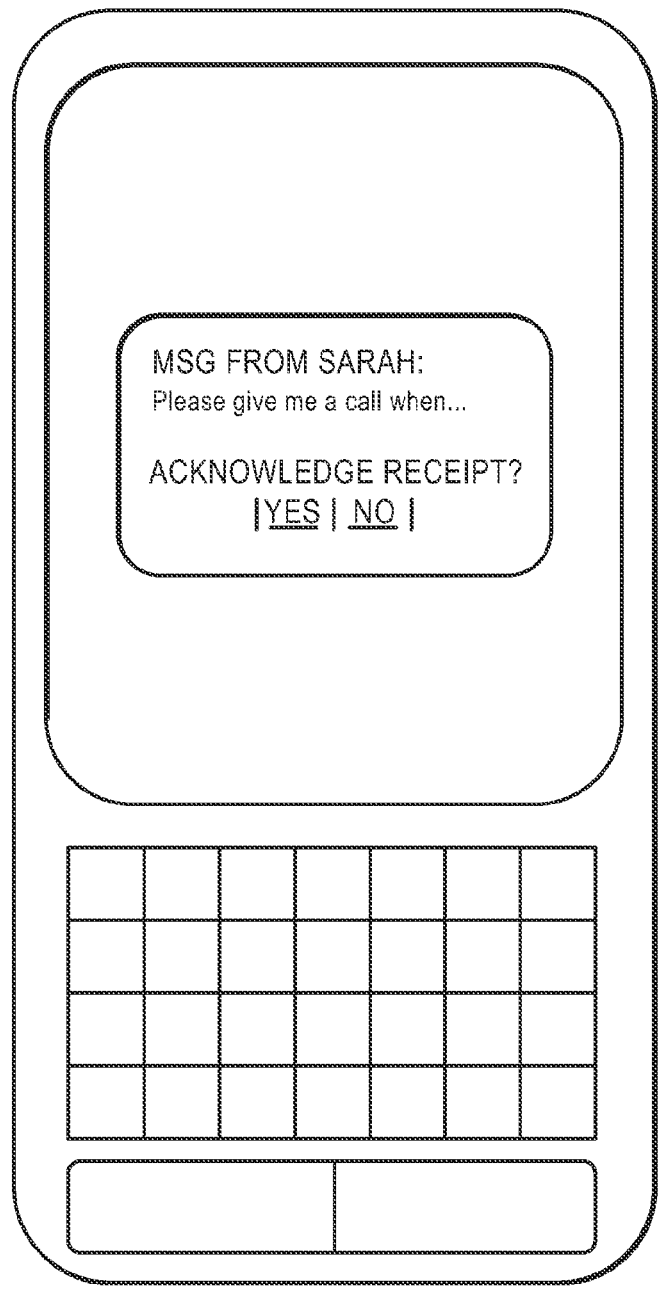
FIG. 8 depicts an example cellular phone with a user query relating to an acknowledgement.
Figure 9:
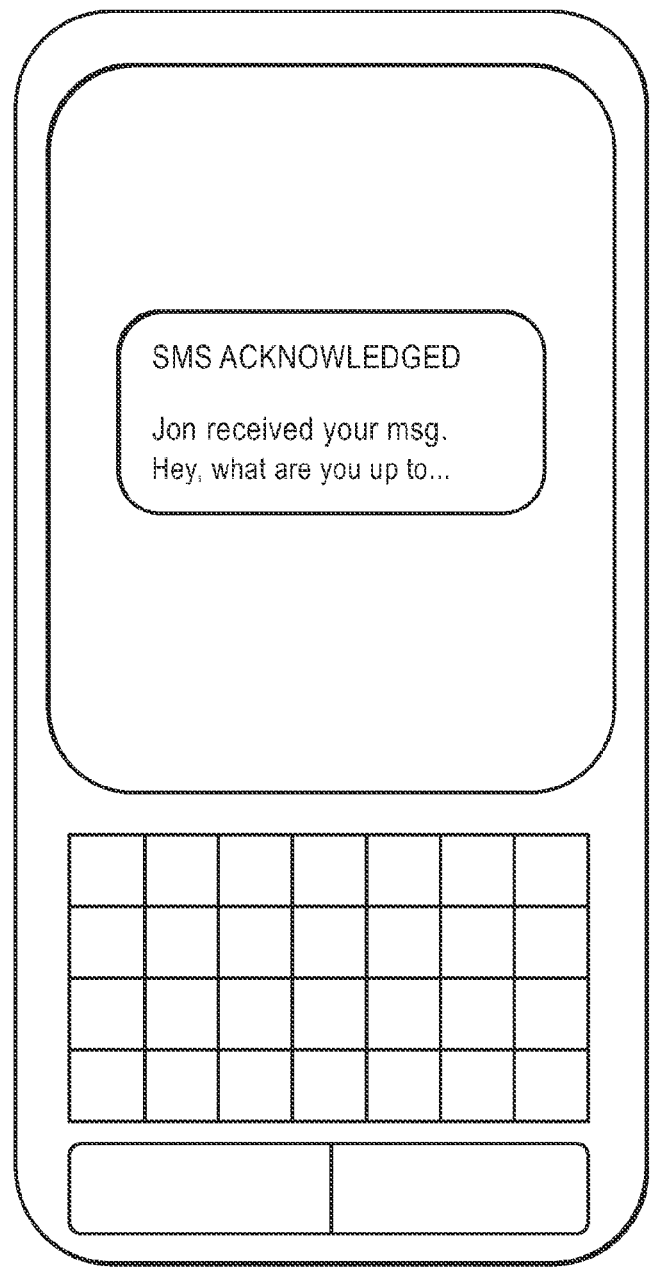
FIG. 9 depicts an example cellular phone with an acknowledgement notice.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In one application of the invention, a device sends an SMS message. The device may comprise among others, a cell phone, mobile phone, smart phone, PDA, service provider system, content provider system, or computer system. The sending of the SMS message (hereinafter referred to simply as "SMS") may be for any number of purposes including, as a news announcement, financial (e.g., stock) announcement, emergency (e.g., medical, fire, etc.), business communication, friend or family messaging, sports announcements, etc.

According to the invention, once an SMS has been sent, the sending device awaits an acknowledgement from the recipient device (typically sent via SMS, but may also be by the receipt of a missed call (say a ring back to the sender from the recipient device which contains the recipient's number as part of the caller id. In some embodiments, this ring back must occur within a prescribed amount of time). After waiting a predetermined amount of time (for example, 1 minute, 2 minutes, 30 minutes, or 1 hour), if an acknowledgement (for example, a statement of "message received" or "successful" or a special code indicating an acknowledgement of receipt of an SMS sent by this device ) is not received, the sending device, according to the software, retransmits the SMS message. In some embodiments, the amount of time the sending device waits before sending a copy of the SMS message can be selected in a variety of ways. In some embodiments, the wait time can be set by the user, for each message as it is being sent, or for all messages generally. In other embodiments, the wait time can be set by software in the phone based on the time of day the message is being sent, or by requesting current network usage from a network entity such as a service provider, or based on the recipient's number, name, or address; for example, the wait time may be based on the country code or area code of the number based on information relating to average or specific latencies to the particular area. In other embodiments, the wait time may be based on message transmission success rates to particular recipients. In some embodiments, a new recipient may automatically start with a long wait time, and with each successive, subsequent SMS, the device may use a shorter wait time unless, an acknowledgment is not received, at which point, the device may use a longer wait time, recursively. The wait time or acknowledgment request may also be based on the type of message or content of message. For example, a service or content provider may indicate that no acknowledgment is received for broadcast messages (e.g., news or sports announcements), but may request a long wait time for acknowledgements of financial information. Additionally, the wait time may be based on the size of the message; shorter messages may have shorter wait times.

If an acknowledgment is not received within the proper wait time, then the device resends the SMS message, and if necessary adjusts the wait time for an acknowledgment. This repeats until an acknowledgement is received, or for a number of iterations set by the user in the software. For example, the message may be sent 1 time immediately, 3 times within the next hour, or once an hour. In other cases, the message may be resent only once, or only twice. The user may be queried by the device to set the number of retry attempts when the initial SMS is sent, or when a resend of an SMS is sent. For example, prior to resending, the user may be queried with a YES/NO screen regarding whether to resend. In other cases, the user may indicate, via device or program settings the number of times to resend an SMS and the SMS is resent without any further user intervention. In some embodiments, the number of times the message is resent may be based on the factors discussed above regarding the wait time, including, for example, resending messages depending on the cost to resend (for example, the device may be set to resend until an acknowledgment is received if the cost to resend is $0.10, and may be set to resend only once if the cost to resend is $0.50.)

The device or program on the device may be programmed to acknowledge only certain messages. For example, only SMS's with a certain prefix or suffix may be acknowledged or those containing certain key words or phrases, or containing certain 8-bit codes.

The recipient device monitors incoming SMS messages and, once having received an SMS, sends an acknowledgement back to the sender that his message was received. (Again, typically via SMS, but may instead be via a missed call, or through another mechanism. For example, it is contemplated that there may be a new system added to the current messaging systems designed specifically for the transport of acknowledgements since they are typically in need of very low time-averaged bandwidth. This contemplated system would work very much like present SMS but be substantially cheaper. Alternatively, SMS protocols may be augmented to allow routing of acknowledgement messages. These messages could be significantly cheaper than typical SMS messages, again because of lower time-averaged bandwidth requirements). If this acknowledgement message were to be lost on its way back, the sending device would simply resend the original SMS message to the recipient, which would then be acknowledged by the recipient device and this time, hopefully, the acknowledgement makes its way back to the sender. In this way, the recipient and sender can be assured that the message got thru at least once, perhaps more due to loss of acknowledgements but for assured delivery, that is of little consequence.

In some embodiments, the above described software is embedded in the devices, but it is also contemplated that such software may be downloaded to the device (say as a retrofit for all the devices out there currently). Ideally, the user can indicate to the software whether a message needs delivery guarantee (i.e., and acknowledgement is required), and if not, the SMS is just sent as always, with no retry on lack of acknowledgement. Furthermore, it is contemplated that a message may include an indication of whether or not an acknowledgement is required so that SMS system (or other system) bandwidth for acknowledgements is only used when requested. This indication may be part of the message itself (for example through the use of a specific sequence or 8-bit characters pre-or post-pended to the message, or may become part of the SMS protocol itself in the future.

In some embodiments of the software, a user can program from whom he wants to request acknowledgements and the software operates to monitor intended recipients and automatically request acknowledgements. In other embodiments, the receive software can be programmed such that messages from defined senders be acknowledged, sometimes even without the sender requesting an acknowledgement in which case the sender may receive and display a message, for example, 'SMS XXX received' where XXX denotes some identifier to the sender. In some embodiments of the invention, an SMS message is pre- or post-pended with alphanumeric or other 8-bit characters that designate that the sender requests an acknowledgement. In some embodiments, the receiving software is operable to strip out these characters when they meet predefined patterns so that they are not displayed to the recipient of the SMS on the receiving device or to perform an action commensurate with that designated by the characters. In some embodiments, the acknowledgment identifier is transparent to the sender in that upon the receipt of the acknowledgment a message such as 'Jon Received the Message' is displayed instead of 'SMS XXX received.' The software may retrieve the name of the recipient from the address book built into the phone, the acknowledgment message, or another source.

In some embodiments, the receiver software queries the recipient as to whether it is ok to send an acknowledgement. In some embodiments the acknowledgement carries special characters indicating that it is an acknowledgement. In some embodiments, the acknowledgement is charged a different rate than other messages carried by the bearer service.

A key aspect of the invention is contemplated to be that the delivery guarantee be end to end. That is, that the sender and receiver enforce the delivery and take corrective messages autonomously from the communication service. The underlying communication protocol (e.g., SMS, etc.) need not be modified. Thus, an acknowledgment need not be witnessed and understood throughout the communication system, only transmitted from end to end. Moreover, there is no need for message storing within the bearer system in order to retransmit a message that is unacknowledged, the sending device does the retransmission. However, certain modifications or additions to the SMS system may be made in accordance with the invention to improve operability or billing.

In yet another embodiment of the invention, the sender software may direct all SMS messages to a specified place, for example, an internet location and indicate to whom the message should be directed. The internet location then forwards the message to the intended recipient and awaits the acknowledgement. Receiving none results in the internet location resending the SMS to the recipient until such time (or in accordance with other disclosed aspects of the invention) that an acknowledgement is received. In this way, the sending device need not send the retries.

In still another embodiment of the invention, the acknowledgements are sent to, for example, an internet location and indicate to whom the acknowledgement is destined. The acknowledgements are stored at the internet location and can be viewed by the original sender of the SMS to whom the acknowledgement is destined via his device's browser (WAP or otherwise) or other software. Alternatively, in some instances, the acknowledgements are viewed by a third party, for example, an employer or the government. After viewing the acknowledgements, the user may then determine whether a retry should be made. In other embodiments, the sending device autonomously monitors the website or other location storing the acknowledgements and determines which if any SMS messages should be resent.

In some embodiments, the SMS message from the sending device to the recipient indicates to where an acknowledgement is to be sent, such as an internet location, or other third party. For example, a content provider may wish to send a single message to multiple recipients and wishes to have an acknowledgement from each of them. The content provider may send the message to a service provider which then sends the message to each of the intended recipients and also indicates that an acknowledgement should be sent directly to the content provider.

Many sending devices now include GPS or other location identifying subsystems. For example, cell phones often include GPS or cellular-based location identifying systems that can indicate the phone's location to the user of the phone, or can report the location of the phone to a website for viewing by third parties, such as employers, parents, spouses, friends, etc. Thus, it is contemplated that a sender or receiver may send a location based message or a location based acknowledgement, respectively. For example, see my co-pending application 20070032225, incorporated herein by reference, for examples of such systems. It is contemplated that aspects of the present invention as herein described be incorporated into those disclosed examples of that application and vice versa.

In some embodiments, location based operations serve to modify the sending of messages and acknowledgements. For example, a message may be indicated as being available for retry only while in a given location or locations. Similarly, an acknowledgement may be requested by the sending device only when the receiving device is in a specified location or locations and the receiving device operates in accord with the request. Alternatively, the sending device may be programmed to only request (or not request) acknowledgements if the sending device is in a specified location or locations. In another embodiment, the user of the receiving device indicates that acknowledgements are only to be sent (or not sent) when at specified locations.

What is claimed is:

1. A method that acknowledges a receiving cell phone's receipt of SMS messages from a sending cell phone, comprising:
   receiving a short message service (SMS) message at the receiving cell phone from the sending cell phone;
   in response to receiving said SMS message, the receiving cell phone automatically initiating a missed call that is configured to provide acknowledgement of the receiving cell phone's receipt of said SMS message,
   wherein said automatically initiating a missed call comprises initiating a call to the sending cell phone by sending a ring back from receiving cell phone to the sending cell phone and terminating the call before being answered at the sending cell phone;
   the call from the receiving phone to the sending cell phone configured to cause the sending cell phone, in response to receiving the ring back within a predetermined amount of time, to refrain from resending the SMS message;
   wherein the act of initiating a missed call is performed by the receiving phone dependent on a particular geographical location detected using the receiving cell phone's GPS function.

2. A wireless device configured to include a non-transitory computer readable medium having program code thereon configured to control the device to:
   receive a short message service (SMS) message at the wireless device from a sending wireless device;
   in response to said receiving, the receiving wireless device automatically initiating a missed call that is configured to provide acknowledgement of the receiving wireless device's receipt of said SMS message,
   wherein said automatically initiating a missed call comprises: initiating a call to the sending wireless device by sending a ring back from receiving wireless device to the sending wireless device and terminating the call before being answered at the sending wireless device;
   the call from the receiving wireless device to the sending wireless device configured to cause the sending wireless device, in response to receiving the ring back within a predetermined amount of time, to refrain from resendinq the SMS message; and
   wherein the act of initiating a missed call is performed by the receiving wireless device dependent on a particular geographical location detected using a GPS function.

3. The method of claim 1 further comprising the receiving cell phone determining from the received SMS message whether the sending cell phone requires acknowledgement prior to automatically calling the sending cell phone for the purposes of making a missed call to indicate receipt of the SMS message.

4. The method of claim 1 further comprising the receiving cell phone determining from the received SMS message whether the SMS message should be acknowledged prior to automatically calling the sending cell phone for the purposes of making a missed call to indicate receipt of the SMS message.

5. The method of claim 1 further comprising the receiving cell phone determining from the received SMS message whether the SMS message includes information indicating that the message should be acknowledged prior to automatically calling the sending cell phone for the purposes of making a missed call to indicate receipt of the SMS message.

6. The method of claim 1 wherein the SMS message is received at the receiving cell phone from an internet location.

7. The wireless device of claim 2 further configured to determine from the received SMS message whether the sending device requires acknowledgement prior to automatically placing a call to the sending device that sent the SMS message.

8. The wireless device of claim 2 further configured to determine from the received SMS message whether the SMS message should be acknowledged prior to automatically placing a call to the sending device that sent the SMS message.

9. The wireless device of claim 2 further configured to determine from the received SMS message whether the SMS message includes information indicating that the message should be acknowledged prior to automatically placing a call to the sending device that sent the SMS message.

10. The wireless device of claim 2 further configured to receive the SMS message from an internet location.

11. A message acknowledgement system, comprising:
   a receiving cell phone configured to receive a short message service (SMS) message from a sending cell phone;
   wherein the receiving cell phone is configured to automatically call the sending cell phone and making the call a missed call to indicate the receiving cell phone's receipt of the SMS message;
   wherein said making the missed call comprises initiating a call to the sending cell phone by sending a ring back from receiving cell phone to the sending cell phone and terminating the call before being answered at the sending cell phone;
   the call from the receiving cell phone to the sending cell phone configured to cause the sending cell phone, in response to receiving the ring back within a predetermined amount of time, to refrain from resending the SMS message; wherein the act of initiating a missed call is performed by the receiving phone dependent on a particular location of the receiving cellphone being detected using the receiving cell phone's GPS function.

12. The system of claim 11 wherein the receiving cell phone is configured to determine from the received SMS message whether the sending cell phone requires acknowledgement prior to automatically calling the sending cell phone for the purposes of making a missed call to indicate receipt of the SMS message.

13. The system of claim 11 wherein the receiving cell phone is configured to determine from the received SMS message whether the SMS message should be acknowledged prior to automatically calling the sending cell phone for the purposes of making a missed call to indicate receipt of the SMS message.

14. The system of claim 11 wherein the receiving cell phone is configured to determine from the received SMS message whether the SMS message includes information indicating that the message should be acknowledged prior to automatically calling the sending cell phone for the purposes of making a missed call to indicate receipt of the SMS message.

15. The system of claim 11 wherein the receiving cells phone is configured to receive the SMS message from an internet location.

* * * * *